United States Patent
Kato et al.

(10) Patent No.: US 10,669,480 B2
(45) Date of Patent: Jun. 2, 2020

(54) PHOSPHORESCENT PHOSPHOR

(71) Applicant: NEMOTO & CO., LTD., Suginami-ku (JP)

(72) Inventors: Masashi Kato, Suginami-ku (JP); Tomoya Sakaguchi, Suginami-ku (JP)

(73) Assignee: NEMOTO & CO., LTD., Suginami-ku (JP)

( * ) Notice: Subject to any disclaimer, the term of this patent is extended or adjusted under 35 U.S.C. 154(b) by 112 days.

(21) Appl. No.: 15/109,012

(22) PCT Filed: Mar. 9, 2015

(86) PCT No.: PCT/JP2015/056862
§ 371 (c)(1),
(2) Date: Jun. 29, 2016

(87) PCT Pub. No.: WO2015/137287
PCT Pub. Date: Sep. 17, 2015

(65) Prior Publication Data
US 2016/0319190 A1    Nov. 3, 2016

(30) Foreign Application Priority Data

Mar. 11, 2014  (JP) ................ 2014-047157

(51) Int. Cl.
*C09K 11/77* (2006.01)
*C09K 11/63* (2006.01)
*C09K 11/55* (2006.01)

(52) U.S. Cl.
CPC ................ *C09K 11/7792* (2013.01)

(58) Field of Classification Search
CPC ....... C09K 11/55; C09K 11/63; C09K 11/634; C09K 11/7734; C09K 2211/181; C04B 2235/3222; C04B 2235/3409; C04B 2235/763
USPC .................... 252/301.4 F, 301.4 R
See application file for complete search history.

(56) References Cited

U.S. PATENT DOCUMENTS

| | | | |
|---|---|---|---|
| 5,424,006 A | 6/1995 | Murayama et al. | |
| 6,117,362 A * | 9/2000 | Yen | C09K 11/7734 117/946 |
| 7,422,704 B2 | 9/2008 | Hirata et al. | |
| 7,427,365 B2 | 9/2008 | Hirata et al. | |
| 9,017,575 B2 | 4/2015 | Sakaguchi et al. | |
| 2011/0101274 A1 | 5/2011 | Kimura et al. | |
| 2011/0291050 A1* | 12/2011 | Kimura | C04B 35/44 252/301.4 R |
| 2013/0020535 A1* | 1/2013 | Sakaguchi | C09K 11/7792 252/301.4 P |

FOREIGN PATENT DOCUMENTS

| | | |
|---|---|---|
| JP | 2 543 825 B2 | 10/1996 |
| JP | 2006-152242 A | 6/2006 |
| JP | 4 597 865 B2 | 12/2010 |
| JP | 4 628 957 B2 | 2/2011 |
| JP | 4 932 189 B2 | 5/2012 |
| WO | 2006/016567 A1 | 2/2006 |
| WO | 2010/007970 A1 | 1/2010 |
| WO | 2010/098426 A1 | 9/2010 |
| WO | 2011/155428 A1 | 12/2011 |

OTHER PUBLICATIONS

Machine translation of JP2006152242A, printed Dec. 24, 2017, 18 pages.*
Machine translation of JP2006152242A, printed Dec. 24, 2017, 18 pages. (Year: 2006).*
Hyunho Shin, et al., "Effect of Alkaline Ions on the Phase Evolution, Photoluminescence, and Afterglow Properties of $SrAl_2O_4$:$Eu^{2+}$, $Dy^{3+}$ Phosphor", Ceramics—Silikaty, 2012, vol. 56(4), (6 pages).
International Search Report dated Mar. 31, 2015 for PCT/JP2015/056862 filed on Mar. 9, 2015.

* cited by examiner

*Primary Examiner* — Matthew E. Hoban
*Assistant Examiner* — Lynne Edmondson
(74) *Attorney, Agent, or Firm* — Oblon, McClelland, Maier & Neustadt, L.L.P.

(57) ABSTRACT

A phosphorescent phosphor having a high afterglow luminance is provided. The phosphorescent phosphor comprises, as a matrix, a compound represented by $MAl_2O_4$, the metal element represented by M comprising Sr, Mg and Ba, and the phosphorescent phosphor containing, Eu as an activator, and Dy as a co-activator, wherein the content of Eu, in terms of molar ratio, is $0.001 \leq Eu/(M+Eu+Dy) \leq 0.05$; the content of Dy, in terms of molar ratio, is $0.004 \leq Dy/(M+Eu+Dy) \leq 0.06$; the content of Mg, in terms of molar ratio, is $0.02 \leq Mg/(M+Eu+Dy) \leq 0.1$; the content of Ba, in terms of molar ratio, is $0.03 \leq Ba/(M+Eu+Dy) \leq 0.15$; and the phosphorescent phosphor contains at least one alkali metal element of the group consisting of Li, Na, K and rubidium (Rb). Mg and Ba as well as the alkali metal element(s) contained in the phosphorescent phosphor provide an excellent phosphorescent phosphor having a high afterglow luminance.

8 Claims, 3 Drawing Sheets

[Figure 1]
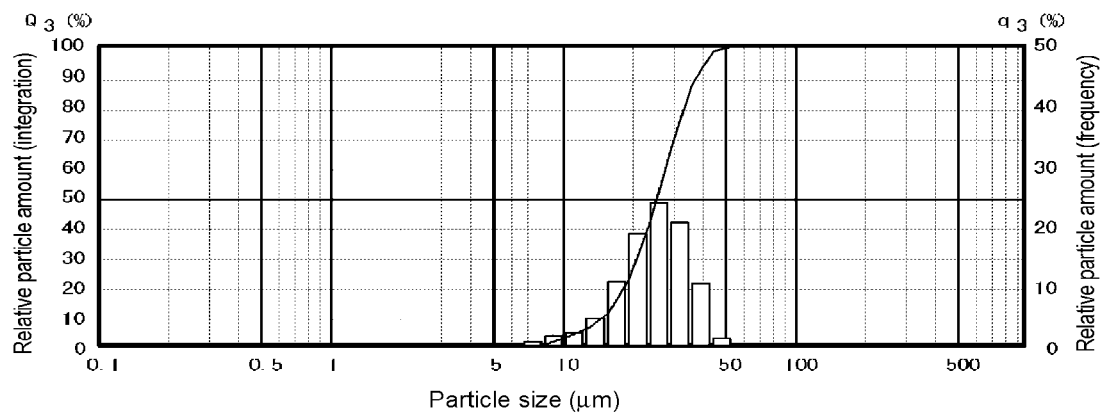
[Figure 2]
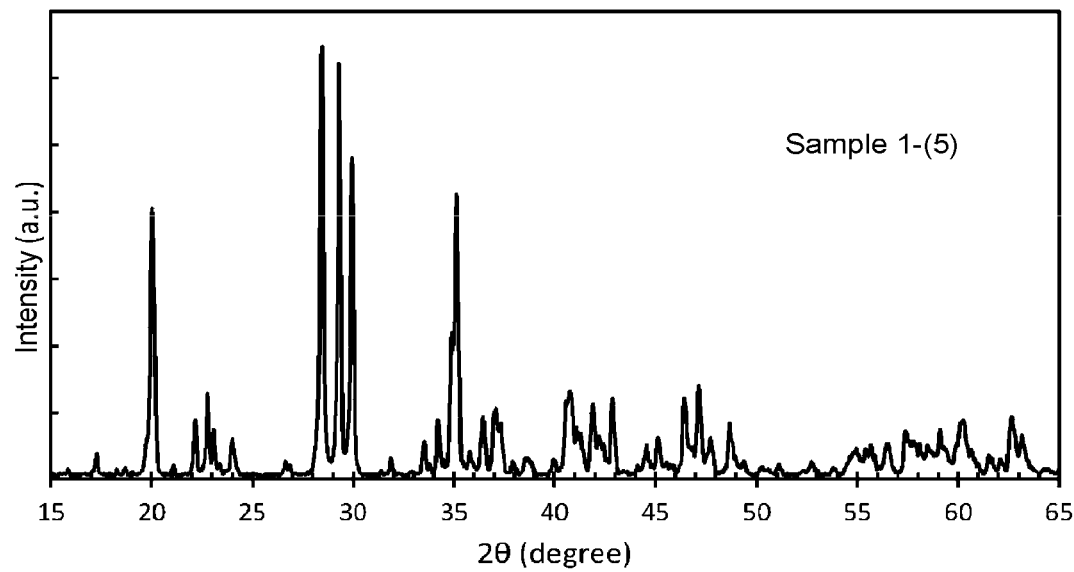

[Figure 3]
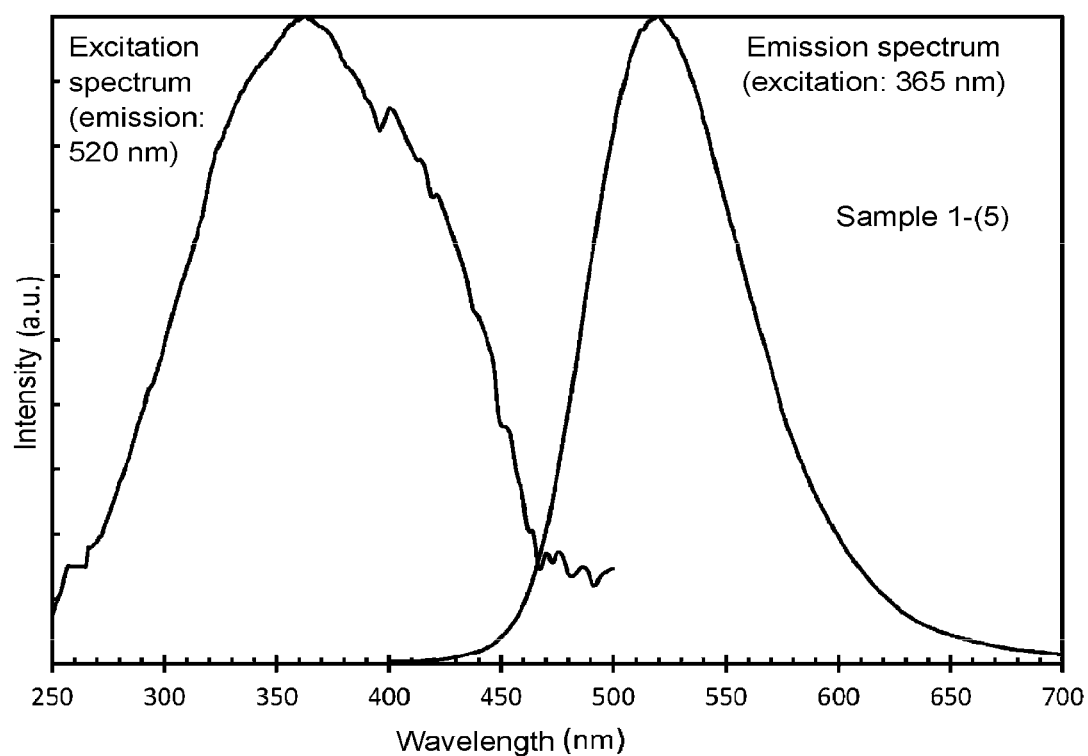
[Figure 4]
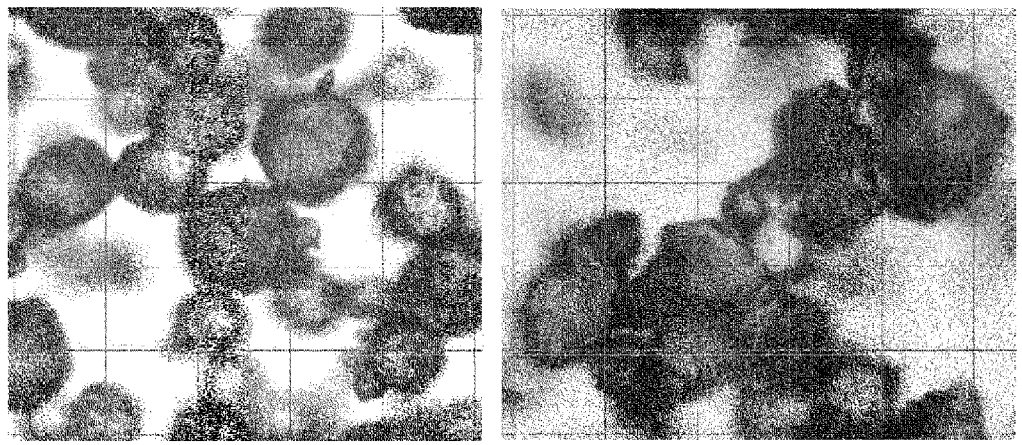
(a) Boric acid (H$_3$BO$_3$): 0.1 % by mass
(b) Boric acid (H$_3$BO$_3$): 1.2 % by mass

[Figure 5]
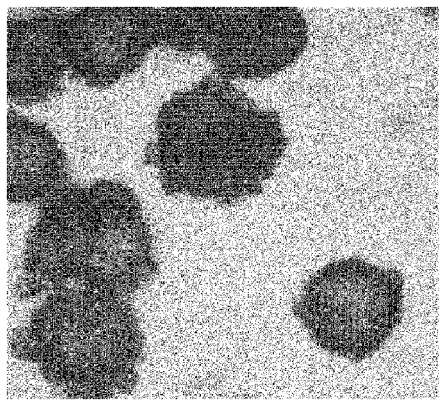
(a) Sample 4-(1) Boron (B): 0.0004 mol
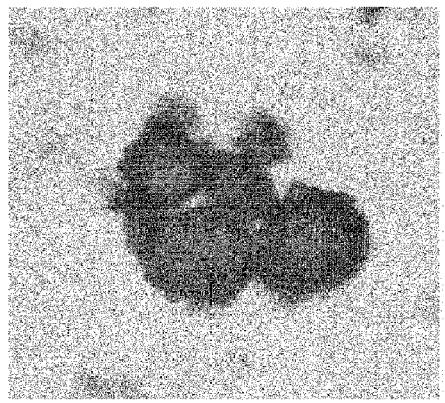
(b) Sample 4-(2) Boron (B): 0.002 mol
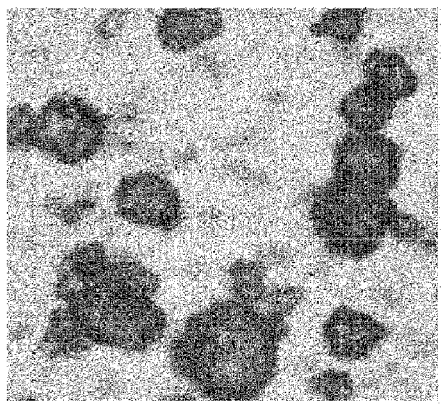
(c) Sample 4-(3) Boron (B): 0.012 mol
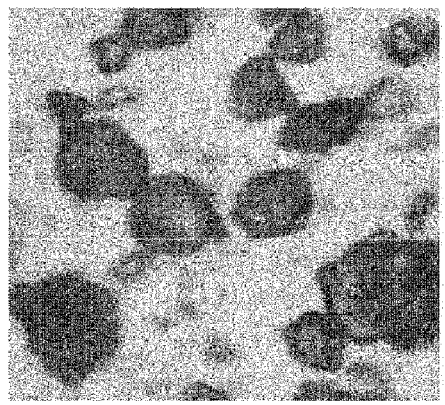
(d) Sample 4-(4) Boron (B): 0.024 mol
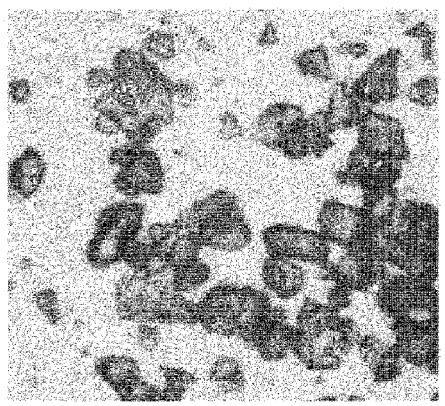
(e) Sample 4-(5) Boron (B): 0.04 mol
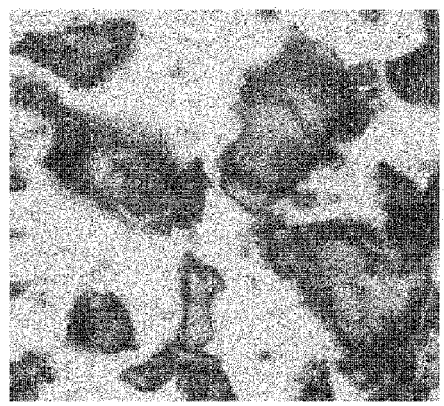
(f) Comparative Example 4 Boron (B): 0.08 mol

PHOSPHORESCENT PHOSPHOR

TECHNICAL FIELD

The present invention relates to a phosphorescent phosphor.

BACKGROUND ART

In general, the afterglow time of a phosphor is extremely short, and the emission of a phosphor rapidly decays when external excitation is ceased. However, in rare cases, even after the cessation of external excitation, some phosphors maintain afterglow of a level perceivable with the naked eye for a considerably long period of time (from a few tens of minutes to a few hours); such a phosphor is referred to as a phosphorescent phosphor or a phosphorescent material in discrimination of such a phosphor from common phosphors.

Examples of the known phosphorescent phosphors include: sulfide phosphors such as CaS:Bi (purple-blue emission), CaSrS:Bi (blue emission), ZnS:Cu (green emission) and ZnCdS:Cu (yellow-orange emission). Any of these sulfide phosphors suffers from a problem such that the phosphors are chemically unstable or poor in light resistance. Even when the zinc sulfide phosphorescent phosphors are used for luminous watches, there is a practical problem such that the afterglow time allowing the naked eye to perceive the time shown by the watches is approximately 30 minutes to 2 hours.

For the purpose of solving these problems, there has been proposed an aluminate phosphorescent phosphor being chemically more stable and more excellent in light resistance, and having an afterglow lasting for a longer period of time than the aforementioned sulfide phosphors. Specifically, there has been proposed a phosphorescent phosphor comprising, as a matrix, a compound represented by $MAl_2O_4$, wherein M represents at least one or more metal elements selected from the group consisting of calcium, strontium and barium (see, for example, Patent Literature 1).

Additionally, there have been proposed phosphorescent phosphors adaptable to various use conditions such as the following: phosphorescent phosphors having a high afterglow luminance in applications for low illumination intensity environments such as indoor type safety signs for escape guidance (see, for example, Patent Literature 2 and Patent Literature 3); and a phosphorescent phosphor having a high afterglow luminance after a long period of time under the conditions that the excitation by the sunlight is provided in the daytime up until sunset such as outdoor type safety signs (see, for example, Patent Literature 4). There has also been proposed a phosphorescent phosphor paying attention to the afterglow characteristics at high temperatures (see, for example, Patent Literature 5).

However, a further practical improvement of the afterglow luminance has been demanded.

CITATION LIST

Patent Literature

Patent Literature 1: Japanese Patent No. 2543825
Patent Literature 2: Japanese Patent No. 4597865
Patent Literature 3: Japanese Patent No. 4628957
Patent Literature 4: International Publication No. 2011/155428
Patent Literature 5: Japanese Patent No. 4932189

SUMMARY OF INVENTION

Technical Problem

An object of the present invention is to provide a phosphorescent phosphor having an excellent afterglow luminance.

Solution to Problem

The present inventors studied various phosphorescent phosphors, and consequently have discovered that preferable are phosphorescent phosphors containing magnesium and barium, and small amounts of alkali metal elements such as sodium and/or potassium.

The phosphorescent phosphor according to a first aspect of the present invention comprises, as a matrix, a compound represented by $MAl_2O_4$, the metal element represented by M comprising strontium (Sr), magnesium (Mg) and barium (Ba), and the phosphorescent phosphor containing europium (Eu) as an activator, and dysprosium (Dy) as a co-activator, wherein the content of europium (Eu), in terms of molar ratio, is $0.001 \leq Eu/(M+Eu+Dy) \leq 0.05$; the content of dysprosium (Dy), in terms of molar ratio, is $0.004 \leq Dy/(M+Eu+Dy) \leq 0.06$; the content of magnesium (Mg), in terms of molar ratio, is $0.02 \leq Mg/(M+Eu+Dy) \leq 0.1$; the content of barium (Ba), in terms of molar ratio, is $0.03 \leq Ba/(M+Eu+Dy) \leq 0.15$; and the phosphorescent phosphor contains at least one alkali metal element of the group consisting of lithium (Li), sodium (Na), potassium (K) and rubidium (Rb). Magnesium and barium as well as the alkali metal element(s) contained in the phosphorescent phosphor, having the aforementioned composition, provide a phosphorescent phosphor having a high afterglow luminance.

The phosphorescent phosphor according to a second aspect of the present invention is the phosphorescent phosphor according to the first aspect of the present invention, wherein the content of the alkali metal element is 0.06 mmol (millimol) or more and 10 mmol or less per mol of the total amount of the metal element represented by M, europium (Eu) and dysprosium (Dy). The content of the alkali metal element set to be 0.06 mmol or more and 10 mmol or less provides a phosphorescent phosphor having a higher afterglow luminance.

The phosphorescent phosphor according to a third aspect of the present invention is the phosphorescent phosphor according to the first or second aspect of the present invention, wherein the alkali metal element is sodium (Na). The selection of sodium (Na) as the alkali metal element provides a phosphorescent phosphor having a high afterglow luminance.

The phosphorescent phosphor according to a fourth aspect of the present invention is the phosphorescent phosphor according to any one of the first to third aspects of the present invention, containing boron (B) in an amount of 0.0004 mol or more and 0.024 mol or less per mol of the total amount of the metal element represented by M, europium (Eu) and dysprosium (Dy). The amount of boron set to fall within the aforementioned range provides an excellent phosphorescent phosphor having a high afterglow luminance, and at the same time, a nonangular particle shape and a high yield.

Advantageous Effects of Invention

Magnesium and barium as well as an alkali metal element contained in the phosphorescent phosphor of the present invention can provide a phosphorescent phosphor having a high afterglow luminance.

BRIEF DESCRIPTION OF DRAWINGS

FIG. 1 is a graph showing the particle size distribution of the phosphorescent phosphor of the sample 1-(5) of the present invention.

FIG. 2 is a powder X-ray diffraction chart of the phosphorescent phosphor of the sample 1-(5) of the present invention.

FIG. 3 is a graph showing the excitation spectrum and the emission spectrum of the phosphorescent phosphor of the sample 1-(5) of the present invention.

FIG. 4 is a photomicrograph showing the particle shape of the phosphorescent phosphor of the sample 1-(5) of the present invention.

FIG. 5 is a photomicrograph showing the particle shapes of the phosphorescent phosphors of the present invention.

DESCRIPTION OF EMBODIMENTS

Next, a process for producing a phosphorescent phosphor is described as an embodiment of the present invention.

As phosphor raw materials, the following raw materials are prepared: a strontium (Sr) raw material such as strontium carbonate ($SrCO_3$); a magnesium (Mg) raw material such as magnesium oxide (MgO) or basic magnesium carbonate; a barium (Ba) raw material such as barium carbonate ($BaCO_3$); an aluminum (Al) raw material such as alumina ($Al_2O_3$); a raw material of europium (Eu) as an activator such as europium oxide ($Eu_2O_3$); a raw material of dysprosium (Dy) as a co-activator such as dysprosium oxide ($Dy_2O_3$); and an alkali metal element, namely, a sodium (Na) raw material such as sodium carbonate ($Na_2CO_3$) or a potassium (K) raw material such as potassium carbonate ($K_2CO_3$).

These phosphor raw materials and, for example, boric acid ($H_3BO_3$) as a flux are weighed to predetermined amounts, and are sufficiently mixed by using a ball mill mixer or the like to prepare a phosphor raw material mixed powder.

In this case, sodium carbonate ($Na_2CO_3$) or potassium carbonate ($K_2CO_3$) respectively as a raw material for sodium (Na) or potassium (K) as an alkali metal element can also be added in a predetermined amount in a state of an aqueous solution.

The resulting mixed powder is put in a heat-resistant vessel such as an alumina crucible, placed in an electric furnace, and fired in a temperature range of 1200° C. or higher and 1800° C. or lower, preferably from 1300° C. or higher and 1600° C. or lower for 2 hours or more and 18 hours or less, preferably, 5 hours or more and 15 hours or less, in a reducing atmosphere.

Examples of the reducing atmosphere include: a nitrogen ($N_2$)+hydrogen ($H_2$) mixed gas and carbon monoxide (CO) gas. Alternatively, a reducing atmosphere may also be formed by performing the firing with carbon powder such as activated carbon or graphite added to the phosphor raw material mixed powder.

After firing, the mixed powder is cooled down to room temperature over 2 to 10 hours. The fired synthetic product is ground and sieved to produce a phosphorescent phosphor having a predetermined particle size.

In the above description, carbonates and oxides are quoted as the examples of the phosphor raw materials; however, any compounds other than the quoted compounds can be used as the phosphor raw materials as long as such compounds are decomposed into oxides at high temperatures. As an example of the flux, boric acid ($H_3BO_3$) is quoted; however, boron compounds other than boric acid ($H_3BO_3$) can also be used. The amount of boric acid as a flux can be appropriately selected; however, if the amount of boric acid is excessive, the fired product is hard. For example, when the amount of boric acid exceeds 1% by mass of the phosphor raw materials, the fired product is hard and the yield is remarkably reduced. In addition, when the hard fired product is ground, the shape of the particles tends to be angular, and causes the degradation of the aesthetic appearance and the quality, such as textured surface when the particles are processed into a surface coating or mixed with a resin and molded. Accordingly, boric acid as a flux is more preferably used as added in an amount of approximately 0.05% by mass to approximately 0.3% by mass of the phosphor raw materials because the effects such as yield improvement and maintenance of spherical particle shape are exhibited. Alternatively, an appropriate selection of the production conditions, such as the elevation of the firing temperature or the selection of, e.g., spherical alumina as a raw material, also allows a phosphorescent phosphor, having performances almost equivalent to the performances achieved with addition of a flux, to be produced without adding any flux.

Next, as the examples of the foregoing embodiment, the phosphorescent phosphor of the present invention and the characteristics thereof are described.

Example 1

As the raw materials, the following were weighed: 126.23 g of strontium carbonate ($SrCO_3$) (0.855 mol in terms of Sr); 4.72 g of basic magnesium carbonate (a lot having a MgO content of 42.7% was used) (0.05 mol in terms of Mg); 9.87 g of barium carbonate ($BaCO_3$) (0.05 mol in terms of Ba); 101.96 g of alumina ($Al_2O_3$) (2 mol in terms of Al); 2.64 g of europium oxide ($Eu_2O_3$) (0.015 mol in terms of Eu); and 5.59 g of dysprosium oxide ($Dy_2O_3$) (0.03 mol in terms of Dy). Additionally, as a flux, 0.25 g of boric acid ($H_3BO_3$) (approximately 0.1% of the mass of the raw materials, approximately 0.004 mol in terms of B) was weighed. Additionally, 5.3 g of sodium carbonate ($Na_2CO_3$) (0.1 mol in terms of Na) was dissolved in water so as for the resulting solution to have a volume of 100 ml, and thus a 1 mmol/ml, in terms of Na, aqueous solution of sodium carbonate was prepared. To these raw materials and the flux, 1.5 ml of the aqueous solution of sodium carbonate (1.5 mmol in terms of Na) was added, and the resulting mixture was sufficiently mixed by using a ball mill.

The resulting mixture was put in an alumina crucible, and fired at 1500° C. for 5 hours in a reducing atmosphere formed with a mixed gas composed of 97% of nitrogen ($N_2$) gas and 3% of hydrogen ($H_2$) gas (flow rate: 25 liters/hr). Subsequently, the mixture was cooled down to room temperature over approximately 8 hours, and the fired synthetic product was successively subjected to a grinding step and a sieving step (passage through a nylon mesh #380) to produce a target phosphorescent phosphor. The resulting phosphorescent phosphor is referred to as the sample 1-(5).

In the same manner as described above, phosphorescent phosphors were synthesized by appropriately varying the amount of the aqueous solution of sodium carbonate added as shown in Table 1, and thus the resulting phosphorescent phosphors inclusive of the sample 1-(5) are referred to as the sample 1-(1) to the sample 1-(8), respectively. Next, a sample in which the aqueous solution of sodium carbonate was not added was synthesized as Comparative Example 1, and additionally, a sample which further did not contain magnesium (Mg) and barium (Ba) was synthesized as Comparative Example 2.

The content of sodium (Na) of each of the resulting sample 1-(1) to the resulting sample 1-(8) was measured by using flame photometry after acid decomposition. The results thus obtained are shown in Table 1.

TABLE 1

| Sample | Sr (mol) | Mg (mol) | Ba (mol) | Eu (mol) | Dy (mol) | Na (mmol) |
|---|---|---|---|---|---|---|
| Comparative Example 1 | 0.855 | 0.05 | 0.05 | 0.015 | 0.03 | 0 |
| Comparative Example 2 | 0.955 | 0 | 0 | 0.015 | 0.03 | 0 |
| Sample 1-(1) | 0.855 | 0.05 | 0.05 | 0.015 | 0.03 | 0.06 |
| Sample 1-(2) | 0.855 | 0.05 | 0.05 | 0.015 | 0.03 | 0.10 |
| Sample 1-(3) | 0.855 | 0.05 | 0.05 | 0.015 | 0.03 | 0.32 |
| Sample 1-(4) | 0.855 | 0.05 | 0.05 | 0.015 | 0.03 | 0.61 |
| Sample 1-(5) | 0.855 | 0.05 | 0.05 | 0.015 | 0.03 | 1.2 |
| Sample 1-(6) | 0.855 | 0.05 | 0.05 | 0.015 | 0.03 | 3.2 |
| Sample 1-(7) | 0.855 | 0.05 | 0.05 | 0.015 | 0.03 | 9.8 |
| Sample 1-(8) | 0.855 | 0.05 | 0.05 | 0.015 | 0.03 | 13.1 |

Next, the sample 1-(5) was subjected to a particle size distribution measurement with a laser diffraction particle size distribution analyzer (Model: SALD-2100, manufactured by Shimadzu Corp.). The results thus obtained are shown in FIG. 1. The sample 1-(5) was also subjected to a powder X-ray diffraction analysis with an X-ray diffractometer (Model: XRD-6100, manufactured by Shimadzu Corp.) using a Cu-tube. The resulting powder X-ray diffraction chart is shown in FIG. 2. As can be seen from FIG. 2, the matrix concerned was a $SrAl_2O_4$ crystal. The sample 1-(5) was also subjected to a measurement of an excitation spectrum and an emission spectrum with a spectrofluorometer (Model: F-4500, manufactured by Hitachi, Ltd.). The results thus obtained are shown in FIG. 3.

In addition, for the purpose of identifying the particle shape, the sample 1-(5) was photographed with a digital microscope. For comparison, a sample was synthesized in the same manner as in the sample 1-(5) except that the amount of boric acid ($H_3BO_3$) added was set to be 3 g (approximately 1.2% by mass, and approximately 0.048 mol in terms of boron B), the particle shape of the synthesized sample was photographed, and the photograph of the sample 1-(5) and the photograph of the synthesized sample are together shown in FIG. 4(a) and FIG. 4(b), respectively. As can be seen from FIG. 4, FIG. 4(a) for the sample 1-(5) shows nearly spherical and smooth particle shapes, and FIG. 4(b) for the sample containing boric acid in an excessive amount shows comparatively angular particle shapes because the sample concerned was prepared by grinding a hard fired product. It was verified that also in the case where the amount of boric acid was set to be 0.75 g (approximately 0.3% by mass), the same particle shapes as FIG. 4(a) were maintained.

Next, the afterglow luminance characteristics of the sample 1-(1) to the sample 1-(8), and Comparative Examples 1 and 2 were evaluated.

The afterglow luminance characteristics were evaluated by preparing coating film samples, a coating film being one of the practically often used forms of phosphorescent phosphors. Specifically, a mixture prepared by mixing a sample of a phosphorescent phosphor and a transparent screen ink (VG Screen Ink; 000 Medium, manufactured by Teikoku Printing Inks Mfg. Co., Ltd.) in a mass ratio of 10:7 was applied to a sheet of paper (non-fluorescent paper), as a substrate, using no fluorescent whitening agent with an applicator (Model YA, manufactured by Yoshimitsu Seiki Co., Ltd.) and spontaneously dried, to form a phosphorescent phosphor coating film, which was used as a coating film sample. The coating film was formed in such a way that the phosphorescent phosphor content of the coating film was approximately 180 $g/m^2$ in terms of the phosphorescent phosphor mass per unit area.

Each of the resulting coating film samples was heated in a dark place at approximately 90° C. for approximately 2 hours to eliminate the afterglow. First, each of the afterglow-eliminated coating film samples was irradiated with light under the first set of excitation conditions that a standard light source D65 was used as an excitation light source, an irradiation light having an illumination intensity of 500 lx was adopted, and an irradiation time of 10 minutes was adopted. For each of the samples and Comparative Examples 1 and 2, the afterglow luminances after 10 minutes, 1 hour and 5 hours after the completion of irradiation were measured by using a luminance meter (Chromaticity Luminance Meter, BM-5A, manufactured by Topcon Corp.). The results thus obtained are shown in Table 2, wherein the relative afterglow luminances of the sample 1-(1) to the sample 1-(8) and Comparative Example 2 are shown by taking the afterglow luminances of Comparative Example 1 as 100.

TABLE 2

| Sample | Mg (mol) | Ba (mol) | Na (mmol) | After 10 minutes | After 1 hour | After 5 hours |
|---|---|---|---|---|---|---|
| Comparative Example 1 | 0.05 | 0.05 | 0 | 100 | 100 | 100 |
| Comparative Example 2 | 0 | 0 | 0 | 108 | 90 | 82 |
| Sample 1-(1) | 0.05 | 0.05 | 0.06 | 115 | 116 | 116 |
| Sample 1-(2) | 0.05 | 0.05 | 0.10 | 116 | 121 | 126 |
| Sample 1-(3) | 0.05 | 0.05 | 0.32 | 120 | 122 | 127 |
| Sample 1-(4) | 0.05 | 0.05 | 0.61 | 117 | 122 | 128 |
| Sample 1-(5) | 0.05 | 0.05 | 1.2 | 113 | 122 | 128 |
| Sample 1-(6) | 0.05 | 0.05 | 3.2 | 109 | 114 | 118 |
| Sample 1-(7) | 0.05 | 0.05 | 9.8 | 107 | 106 | 105 |
| Sample 1-(8) | 0.05 | 0.05 | 13.1 | 17 | 19 | 16 |

As can be seen from the results shown in Table 2, the sample 1-(1) to the sample 1-(7) in each of which sodium (Na) was added were each improved in afterglow luminance, as compared to Comparative Example 1 in which sodium (Na) was not contained. As can also be seen, the sample 1-(1) to the sample 1-(7) were each improved in afterglow luminance, as compared to Comparative Example 2 in which magnesium (Mg), barium (Ba) and sodium (Na) were not contained. As can also be seen, the sample 1-(8) in which sodium (Na) was added excessively in an amount exceeding 10 mmol was reduced in afterglow luminance.

Next, each of the coating film samples from each of which the afterglow was again eliminated was irradiated with light under the second set of excitation conditions that a xenon lamp was used as an excitation light source, an irradiation light having an illumination radiation intensity of 400

μW/cm² as measured with an ultraviolet radiation intensity meter (Ultraviolet Ray Intensity Meter UM-10, manufactured by Konica Minolta Holdings, Inc.) (light receiver: UM-400) was adopted, and an irradiation time of 60 minutes was adopted. For each of the samples and Comparative Examples 1 and 2, the afterglow luminances after 10 minutes, 1 hour and 5 hours after the completion of irradiation were measured in the same manner as in the case of the foregoing first set of excitation conditions. The results thus obtained are shown in Table 3, wherein the relative afterglow luminances of the samples and Comparative Example 2 are shown by taking the afterglow luminances of Comparative Example 1 as 100.

TABLE 3

| Sample | Mg (mol) | Ba (mol) | Na (mmol) | After 10 minutes | After 1 hour | After 5 hours |
|---|---|---|---|---|---|---|
| Comparative Example 1 | 0.05 | 0.05 | 0 | 100 | 100 | 100 |
| Comparative Example 2 | 0 | 0 | 0 | 93 | 89 | 88 |
| Sample 1-(1) | 0.05 | 0.05 | 0.06 | 117 | 119 | 121 |
| Sample 1-(2) | 0.05 | 0.05 | 0.10 | 121 | 124 | 127 |
| Sample 1-(3) | 0.05 | 0.05 | 0.32 | 127 | 128 | 127 |
| Sample 1-(4) | 0.05 | 0.05 | 0.61 | 128 | 128 | 128 |
| Sample 1-(5) | 0.05 | 0.05 | 1.2 | 128 | 129 | 129 |
| Sample 1-(6) | 0.05 | 0.05 | 3.2 | 123 | 124 | 125 |
| Sample 1-(7) | 0.05 | 0.05 | 9.8 | 103 | 105 | 106 |
| Sample 1-(8) | 0.05 | 0.05 | 13.1 | 55 | 49 | 38 |

As can be seen from the results shown in Table 3, also in the case of the second set of excitation conditions, the sample 1-(1) to the sample 1-(7) in each of which sodium was added were each improved in afterglow luminance, as compared to Comparative Example 1 in which sodium (Na) was not contained. As can also be seen, the sample 1-(1) to the sample 1-(7) were each improved in afterglow luminance, as compared to Comparative Example 2 in which magnesium (Mg), barium (Ba) and sodium (Na) were not contained. As can also be seen, the sample 1-(8) in which sodium (Na) was added excessively in an amount exceeding 10 mmol was reduced in afterglow luminance.

As can be seen from what has been described above, the phosphorescent phosphors of the present invention containing magnesium (Mg) and barium (Ba) as well as sodium (Na) have an excellent afterglow luminance as compared to Comparative Examples 1 and 2. In particular, as can be seen, the sample 1-(2) to the sample 1-(6) in which the amount of sodium (Na) fell within a range from 0.1 mmol to 3.2 mmol exhibited a higher afterglow luminance.

Next, as Example of another embodiment other than the aforementioned embodiment, examples in which as the alkali metal elements, potassium (K), lithium (Li) and rubidium (Rb) were added are presented.

Example 2

Samples were synthesized by the same production method as for the sample 1-(5) of Example 1 except that as the carbonates of the alkali metal elements, in place of sodium carbonate ($Na_2CO_3$), potassium carbonate ($K_2CO_3$), lithium carbonate ($Li_2CO_3$) and rubidium carbonate ($Rb_2CO_3$) were used and appropriately added as shown in Table 4, and the resulting samples are referred to as the sample 2-(1) to the sample 2-(7), respectively. The content of each of the alkali metal elements was measured by flame photometry in the same manner as in Example 1.

TABLE 4

| Sample | Sr (mol) | Mg (mol) | Ba (mol) | Eu (mol) | Dy (mol) | Alkali metal element (mmol) | |
|---|---|---|---|---|---|---|---|
| Comparative Example 1 | 0.855 | 0.05 | 0.05 | 0.015 | 0.03 | — | 0 |
| Sample 2-(1) | 0.855 | 0.05 | 0.05 | 0.015 | 0.03 | K | 0.36 |
| Sample 2-(2) | 0.855 | 0.05 | 0.05 | 0.015 | 0.03 | K | 2.7 |
| Sample 2-(3) | 0.855 | 0.05 | 0.05 | 0.015 | 0.03 | Li | 0.23 |
| Sample 2-(4) | 0.855 | 0.05 | 0.05 | 0.015 | 0.03 | Li | 1.8 |
| Sample 2-(5) | 0.855 | 0.05 | 0.05 | 0.015 | 0.03 | Rb | 0.21 |
| Sample 2-(6) | 0.855 | 0.05 | 0.05 | 0.015 | 0.03 | Rb | 0.98 |
| Sample 2-(7) | 0.855 | 0.05 | 0.05 | 0.015 | 0.03 | Na | 0.97 |
| | | | | | | K | 1.93 |

For each of the resulting sample 2-(1) to the resulting sample 2-(7), a phosphorescent phosphor coating film sample was prepared in the same manner as in Example 1, and each of the resulting phosphorescent phosphor coating film samples was subjected to the afterglow luminance measurement by using the first set of excitation conditions (D65 light source/500 lx/10 minutes). The results thus obtained are shown in Table 5, wherein the relative afterglow luminances of the samples are shown by taking the afterglow luminances of Comparative Example 1 as 100.

TABLE 5

| Sample | Alkali metal element | (mmol) | After 10 minutes | After 1 hour | After 5 hours |
|---|---|---|---|---|---|
| Comparative Example 1 | — | 0 | 100 | 100 | 100 |
| Sample 2-(1) | K | 0.36 | 111 | 114 | 119 |
| Sample 2-(2) | K | 2.7 | 106 | 109 | 115 |
| Sample 2-(3) | Li | 0.23 | 114 | 116 | 121 |
| Sample 2-(4) | Li | 1.8 | 110 | 112 | 114 |
| Sample 2-(5) | Rb | 0.21 | 118 | 120 | 120 |
| Sample 2-(6) | Rb | 0.98 | 126 | 127 | 126 |
| Sample 2-(7) | Na | 0.97 | 109 | 111 | 113 |
| | K | 1.93 | | | |

As can be seen from the results shown in Table 5, the afterglow luminance was improved as compared with Comparative Example 1 in all the cases where any of the alkali metal elements, potassium (K), lithium (Li) and rubidium (Rb) was added. In addition to the sample 2-(7), the cases in each of which a plurality of the aforementioned alkali metal elements were added in combination were also experimentally studied, and although the results obtained are not shown as examples, the same afterglow luminance improvement effect was verified.

Next, examples of the phosphorescent phosphors in which the amounts of magnesium (Mg), barium (Ba), europium (Eu) and dysprosium (Dy) were varied are presented.

Example 3

Samples to which sodium (Na) was added as the alkali metal element were synthesized by the same production method as for the sample 1-(5) of Example 1 except that the amounts of magnesium (Mg), barium (Ba), europium (Eu) and dysprosium (Dy) added were varied as shown in Table 6, and the resulting samples are referred to as the sample 3-(1) to the sample 3-(4), respectively. The content of sodium (Na) was measured by flame photometry in the same manner as in Example 1. Additionally, samples were synthesized on the basis of the same compositions as in the sample 3-(1) to the sample 3-(4) except that sodium (Na)

was not added, and the resulting samples are referred to as Comparative Example 3-(1) to Comparative Example 3-(4), respectively.

TABLE 6

| Sample | Sr (mol) | Mg (mol) | Ba (mol) | Eu (mol) | Dy (mol) | Na (mmol) |
|---|---|---|---|---|---|---|
| Comparative Example 3-(1) | 0.905 | 0.02 | 0.03 | 0.015 | 0.03 | 0 |
| Sample 3-(1) | 0.905 | 0.02 | 0.03 | 0.015 | 0.03 | 1.2 |
| Comparative Example 3-(2) | 0.705 | 0.1 | 0.15 | 0.015 | 0.03 | 0 |
| Sample 3-(2) | 0.705 | 0.1 | 0.15 | 0.015 | 0.03 | 1.3 |
| Comparative Example 3-(3) | 0.895 | 0.05 | 0.05 | 0.001 | 0.004 | 0 |
| Sample 3-(3) | 0.895 | 0.05 | 0.05 | 0.001 | 0.004 | 1.2 |
| Comparative Example 3-(4) | 0.79 | 0.05 | 0.05 | 0.05 | 0.06 | 0 |
| Sample 3-(4) | 0.79 | 0.05 | 0.05 | 0.05 | 0.06 | 1.3 |

For each of the synthesized sample 3-(1) to the synthesized sample 3-(4), and corresponding Comparative Example 3-(1) to Comparative Example 3-(4), a phosphorescent phosphor coating film sample was prepared in the same manner as in Example 1, and each of the resulting phosphorescent phosphor coating film samples was subjected to the afterglow luminance measurement by using the first set of excitation conditions (D65 light source/500 lx/10 minutes). The results thus obtained are shown in Table 7, wherein the relative afterglow luminances of the samples are shown by taking the afterglow luminances of corresponding Comparative Examples as 100, respectively.

TABLE 7

| Sample | After 10 minutes | After 1 hour | After 5 hours |
|---|---|---|---|
| Comparative Example 3-(1) | 100 | 100 | 100 |
| Sample 3-(1) | 107 | 110 | 111 |
| Comparative Example 3-(2) | 100 | 100 | 100 |
| Sample 3-(2) | 106 | 112 | 115 |
| Comparative Example 3-(3) | 100 | 100 | 100 |
| Sample 3-(3) | 104 | 107 | 108 |
| Comparative Example 3-(4) | 100 | 100 | 100 |
| Sample 3-(4) | 107 | 109 | 110 |

As can be seen from the results shown in Table 7, any of the samples was improved in afterglow luminance as compared to corresponding Comparative Example which did not contain sodium (Na).

Next, examples of the phosphorescent phosphors in which the amount of boric acid ($H_3BO_3$) added used as a flux was varied are presented.

Example 4

Samples were synthesized by the same production method as for the sample 1-(5) of Example 1 except that the amount of boric acid ($H_3BO_3$) added used as a flux was varied as shown in Table 8, and the resulting samples are referred to as the sample 4-(1) to the sample 4-(5), respectively. In addition, for comparison, a sample was synthesized on the basis of the composition, corresponding to Example 40 in Patent Literature 1, in which neither magnesium (Mg) nor barium (Ba) was contained, the amount of europium (Eu) was set to be 0.01 mol and the amount of dysprosium (Dy) was set to be 0.02 mol, sodium (Na) was added in an amount of 10 mmol, and boric acid ($H_3BO_3$) was added in an amount of 0.08 mol (0.08 mol in terms of boron (B)), and the resulting sample is referred to as Comparative Example 4. The content of sodium (Na) was measured by flame photometry in the same manner as in Example 1.

TABLE 8

| Sample | Sr (mol) | Mg (mol) | Ba (mol) | Eu (mol) | Dy (mol) | Na (mmol) | Boric acid (% by mass) | B (mol) |
|---|---|---|---|---|---|---|---|---|
| Comparative Example 1 | 0.855 | 0.05 | 0.05 | 0.015 | 0.03 | 0 | 0.1 | 0.004 |
| Comparative Example 4 | 0.96 | 0 | 0 | 0.01 | 0.02 | 9.4 | 2 | 0.08 |
| Sample 4-(1) | 0.855 | 0.05 | 0.05 | 0.015 | 0.03 | 1.1 | 0.01 | 0.0004 |
| Sample 4-(2) | 0.855 | 0.05 | 0.05 | 0.015 | 0.03 | 1.2 | 0.05 | 0.002 |
| Sample 1-(5) | 0.855 | 0.05 | 0.05 | 0.015 | 0.03 | 1.2 | 0.1 | 0.004 |
| Sample 4-(3) | 0.855 | 0.05 | 0.05 | 0.015 | 0.03 | 1.3 | 0.3 | 0.012 |
| Sample 4-(4) | 0.855 | 0.05 | 0.05 | 0.015 | 0.03 | 1.2 | 0.6 | 0.024 |
| Sample 4-(5) | 0.855 | 0.05 | 0.05 | 0.015 | 0.03 | 1.3 | 1 | 0.04 |

For each of the resulting sample 4-(1) to the resulting sample 4-(5), and Comparative Example 4, a phosphorescent phosphor coating film sample was prepared in the same manner as in Example 1, and each of the resulting phosphorescent phosphor coating film samples was subjected to the afterglow luminance measurement by using the first set of excitation conditions (D65 light source/500 lx/10 minutes). The results thus obtained are shown in Table 9, wherein the relative afterglow luminances of the samples and Comparative Example 4 are shown by taking the afterglow luminances of Comparative Example 1 as 100. It is to be noted that the amount of boric acid ($H_3BO_3$) added is expressed in terms of the number of moles of the boron (B) element. In addition, for the purpose of identifying the particle shape of each of the samples and Comparative Example 4, the particle shape of each of the samples and Comparative Example 4 was photographed with a digital microscope. The results thus obtained are shown in FIG. 5.

TABLE 9

| Sample | Mg (mol) | Ba (mol) | Eu (mol) | Dy (mol) | Na (mmol) | B (mol) | After 10 minutes | After 1 hour | After 5 hours |
|---|---|---|---|---|---|---|---|---|---|
| Comparative Example 1 | 0.05 | 0.05 | 0.015 | 0.03 | 0 | 0.004 | 100 | 100 | 100 |
| Comparative Example 4 | 0 | 0 | 0.01 | 0.02 | 9.4 | 0.08 | 48 | 65 | 85 |
| Sample 4-(1) | 0.05 | 0.05 | 0.015 | 0.03 | 1.1 | 0.0004 | 104 | 109 | 113 |
| Sample 4-(2) | 0.05 | 0.05 | 0.015 | 0.03 | 1.2 | 0.002 | 108 | 116 | 121 |
| Sample 1-(5) | 0.05 | 0.05 | 0.015 | 0.03 | 1.2 | 0.004 | 113 | 122 | 128 |
| Sample 4-(3) | 0.05 | 0.05 | 0.015 | 0.03 | 1.3 | 0.012 | 111 | 119 | 125 |
| Sample 4-(4) | 0.05 | 0.05 | 0.015 | 0.03 | 1.2 | 0.024 | 110 | 117 | 120 |
| Sample 4-(5) | 0.05 | 0.05 | 0.015 | 0.03 | 1.3 | 0.04 | 109 | 114 | 117 |

As can be seen from the results shown in Table 9, when the amount of boron (B) was 0.0004 mol or more, the afterglow luminances were higher than those of Comparative Example 1. In particular, the samples containing boron (B) in an amount of 0.002 mol or more had particularly excellent afterglow luminances. As can also be seen, Comparative Example 4 corresponding to Example 40 in Patent Literature 1 was remarkably lower in afterglow luminance than Comparative Example 1.

In the results shown in FIG. 5 and foregoing FIG. 4, the sample 4-(1) to the sample 4-(4) and the sample 1-(5) (namely, corresponding to FIG. 5(a), FIG. 5(b), FIG. 5(c), FIG. 5(d) and FIG. 4(a), respectively) in which the amount of boron (B) was 0.0004 mol or more and 0.024 mol or less were all approximately spherical in particle shape. In particular, the sample 4-(1) to the sample 4-(3) and the sample 1-(5) in which the amount of boron was 0.0004 mol or more and 0.012 mol or less, more preferably, had smooth particle shapes. On the other hand, as can be seen from FIG. 5 and FIG. 4, in each of the sample 4-(5), Comparative Example 4 and the sample of FIG. 4(b), in which the amount of boron exceeded 0.024 mol and was 0.04 mol to 0.08 mol, since the excessive amount of boron (B) provided a hard fired product, the particle shape was angular due to the grinding of the hard fired product.

The particle shape of the phosphorescent phosphor is one of the important factors for the purpose of industrially applying the phosphorescent phosphor. For example, when a coating film is formed with an ink using a phosphorescent phosphor having an approximately spherical particle shape or a particle shape smooth in surface, the exterior appearance of the resulting coating film is smooth and is provided with aesthetic appearance, and hence such a phosphorescent phosphor can be used in various applications inclusive of application to watches. On the other hand, when a coating film is formed similarly with an ink using a phosphorescent phosphor having an angular particle shape, the exterior appearance of the resulting coating film is coarse and rough and has an impaired aesthetic appearance, and hence such a phosphorescent phosphor offers a problem when used as incorporated in various products. In particular, such a phosphorescent phosphor cannot be used in products such as watches in which exterior appearance is an important factor. In addition to these coating films, for example, in the case where molded articles are produced by kneading a phosphorescent phosphor with a resin, when a phosphorescent phosphor having an angular particle shape is used, the exterior appearance of the resulting molded articles is degraded, as compared with the case of using a phosphorescent phosphor having an approximately spherical and smooth particle shape, and hence such molded articles have difficulty in being used as actual articles. From another viewpoint, when the amount of boron (B) is too large, the fired synthetic product is solidified hard, hence there is a problem that it is difficult to produce a phosphorescent phosphor having a predetermined particle size by grinding such a hard fired product, and the product yield is also reduced.

As can be seen from these results, the amount of boric acid ($H_3BO_3$) added, in terms of the content of boron (B), is preferably 0.0004 mol or more and 0.024 mol or less, and particularly preferably 0.002 mol or more and 0.012 mol or less, because a high afterglow luminance is exhibited, and the resulting phosphorescent phosphor has an approximately spherical and smooth particle shape.

As described above, the phosphorescent phosphor of the present invention includes magnesium (Mg) and barium (Ba), and at the same time an alkali metal element such as sodium (Na) or potassium (K), and thus an excellent phosphorescent phosphor having a high afterglow luminance is provided.

INDUSTRIAL APPLICABILITY

The phosphorescent phosphor of the present invention can be used in various applications, and in particular, can be used suitably in the application to luminous watches required to have an afterglow luminance of a predetermined level or higher, even after a long period of time. The phosphorescent phosphor of the present invention can also be suitably used for phosphorescent information signs, safety signs, guide signs and the like.

The invention claimed is:

1. A phosphorescent phosphor comprising, as a matrix, a compound $MAl_2O_4$, wherein:

M comprises strontium (Sr), magnesium (Mg), and barium (Ba);

the phosphorescent phosphor contains europium (Eu) as an activator, and dysprosium (Dy) as a co-activator;

a content of europium (Eu), in terms of molar ratio, is $0.001 \leq Eu/(M+Eu+Dy) \leq 0.05$;

a content of dysprosium (Dy), in terms of molar ratio, is $0.004 \leq Dy/(M+Eu+Dy) \leq 0.06$;

a content of magnesium (Mg) in terms of molar ratio, is $0.02 \leq Mg/(M+Eu+Dy) \leq 0.1$;

a content of barium (Ba), in terms of molar ratio, is $0.03 \leq Ba/(M+Eu+Dy) \leq 0.15$;

the phosphorescent phosphor contains sodium (Na); and
a content of sodium (Na) is 0.06 to 3.2 mmol per mol of a total amount of M, europium (Eu), and dysprosium (Dy).

2. The phosphorescent phosphor according to claim 1, containing boron (B) in an amount of 0.0004 to 0.024 mol per mol of a total amount of M, europium (Eu), and dysprosium (Dy).

3. The phosphorescent phosphor according to claim 1, wherein the phosphorescent phosphor is prepared from raw materials including:
a strontium (Sr) raw material;
a magnesium (Mg) raw material;
a barium (Ba) raw material;
an aluminum (Al) raw material;
a europium (Eu) raw material;
a dysprosium of (Dy) raw material;
a sodium (Na) raw material; and
a flux.

4. The phosphorescent phosphor according to claim 3, wherein the phosphorescent phosphor is prepared by:
mixing the raw materials to form a mixed powder; and
firing the mixed powder in a reducing atmosphere.

5. The phosphorescent phosphor according to claim 1, wherein the phosphorescent phosphor is prepared from raw materials including:
strontium carbonate ($SrCO_3$);
at least one of magnesium oxide (MgO) and basic magnesium carbonate;
barium carbonate ($BaCO_3$);
alumina ($Al_2O_3$);
europium oxide ($Eu_2O_3$);
dysprosium oxide ($Dy_2O_3$);
at least one of sodium carbonate ($Na_2CO_3$); and
boric acid ($H_3BO_3$) as a flux.

6. The phosphorescent phosphor according to claim 5, wherein the phosphorescent phosphor is prepared by:
milling the raw materials to form a mixed powder; and
firing the mixed powder at a temperature of 1,200° C. to 1800° C. for a period of 2 to 18 hours in a reducing atmosphere.

7. The phosphorescent phosphor according to claim 1, wherein the content of sodium (Na) is 0.10 to 3.2 mmol per mol of the total amount of M, europium (Eu), and dysprosium (Dy).

8. The phosphorescent phosphor according to claim 1, wherein the content of sodium (Na) is 0.06 to 0.61 mmol per mol of the total amount of M, europium (Eu), and dysprosium (Dy).

* * * * *